April 8, 1930.    F. W. REIMOLD    1,754,048
RELEASING COUPLING
Filed July 2, 1928

WITNESSES
Jos. L. Lamia
Chris Feinle

INVENTOR
Fred W. Reimold
BY
ATTORNEY

Patented Apr. 8, 1930

1,754,048

UNITED STATES PATENT OFFICE

FRED W. REIMOLD, OF NEWARK, NEW JERSEY

RELEASING COUPLING

Original application filed August 22, 1927, Serial No. 214,644. Divided and this application filed July 2, 1928. Serial No. 289,927.

This invention relates to a releasing coupling which is divided from the subject matter of my co-pending application filed August 22, 1927, Serial No. 214,644.

The coupling has a wide range of application for the purpose of releasing or uncoupling cooperative appurtenances, to avert injury to or the breaking of parts thereof, when a pulling force to which one of the appurtenances is subjected by the other one, becomes excessive from any cause in the ordinary use of said appurtenances.

The coupling may be used advantageously in conjunction with a pulling vehicle, such as a tractor, and a drawn vehicle, such as a plow, for the purpose of releasing the drawn vehicle or plow, when the latter encounters a rock or other obstruction in the ground, to avert possible injury or breaking of parts.

With the foregoing and other objects in view, the invention resides in the provision of a coupling which will be of practical and rugged construction, one which will be reliable in operation, and one which will be of long life.

The nature of the invention and its distinguishing features and advantages will appear when the following specification is read in connection with the accompanying drawing, in which Figure 1 is a plan view of the coupling.

Figure 1:
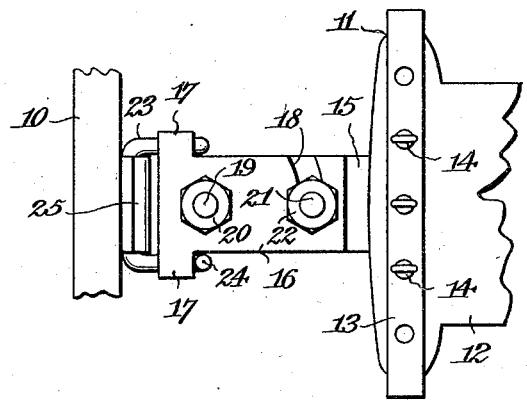
Figure 2:
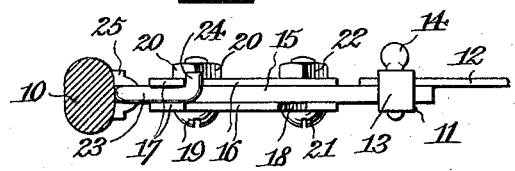
Fig. 2 is a side view.
Figure 3:
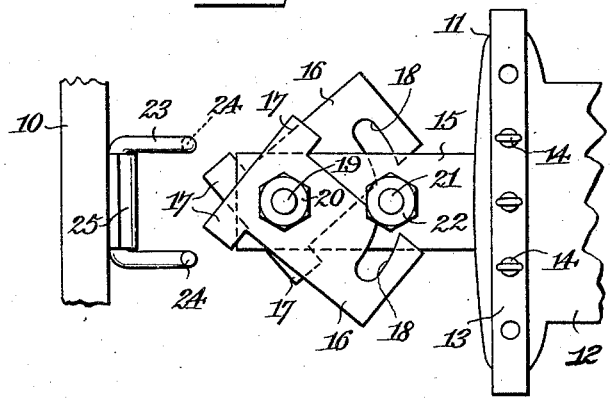
Fig. 3 is a plan view illustrating parts of the coupling in a releasing relationship.

In the illustrated embodiment of the invention which is by way of example, there is shown a block 10 which constitutes a part of a drawn vehicle or implement such as a plow, and a clevis 11 adapted for connection with a part of a pulling vehicle such as a tractor. In the present instance the clevis 11 consists of a plate 12 having a series of holes therein, and a bar 13 having a series of holes therein for the accommodation of suitable pins 14 which extend through the holes in the plate 12 and the bar 13 to obtain the desired draft.

A member 15 is rigidly connected at one end with the bar 13. Members 16 in the form of plates are provided. The plates 16 are similar in construction, and each is provided with lateral lugs 17 at one end, and an arcuate notch 18 at the opposite end which opens through one side edge thereof. The members or plates 16 are arranged respectively at the top and bottom sides of the member 15 in frictional contact therewith, and are retained in place for pivotal movement by means of a bolt 19 and nut 20 which also serve to keep the members 16 in frictional contact with said member 15, under a certain amount of resisting pressure. A bolt 21 carried by the member 15 projects upwardly so as to be received in the notches 18 in the members or plates 16. The bolt 21 is provided with a nut 22 to hold the same in place. The bolt 21 serves as a stop to limit the pivotal movement of the members or plates 16 to normally set positions as shown in Fig. 1. A coupler member 23 of substantially U-shape, having oppositely directed terminals 24 is securely held on the block 10 by a strap 25. One of the terminals 24 of the member 23 is adapted to engage one of the lugs 17 of the upper plate or member 16, and the other terminal 24 is adapted to engage one of the lugs 17 of the lower member or plate 16. It will be apparent that the terminals 24 are disposed respectively at opposite sides of the point of pivotal connection of the members or plates 16 with the member 15. The arrangement of the parts is such that when the members or plates 16 and the coupler member 23 are subjected to an unusual or excessive pulling force, the members 16 will move on the pivot afforded by the bolt 19, cause movement of the members 16 in opposite directions, and consequent disengagement of the terminals 24 with the lugs 17, thereby releasing the drawn vehicle or implement. In this way injury or the breaking of parts will be averted. It will be apparent that when two of the lugs 17 become worn, the remaining two lugs 17 may be employed in conjunction with the coupler terminals 24, thereby prolonging life of the members or plates 16.

It is to be understood that the releasing coupler may be employed for hitching or coupling drawn vehicles to pulling vehicles, and that the device may be also applied in conjunction with any other cooperative appurtenances, and that the necessary changes or modifications in the details within the scope of the claims hereunto appended, may be resorted to for carrying out the results looked for.

I claim:

1. In a releasing coupling, the combination with a clevis plate, of members, means which connects said members with said clevis plate for pivotal movement and which subjects said members to a predetermined amount of pressure, means limiting the movement of said members to normally set positions, a relatively fixed coupler member, and coacting means on said coupler member and the first mentioned members, said coacting means being disengageable to release said coupler member, by the pivotal movement of the first mentioned members, when all of said members are subjected to an excessive pulling force.

2. In a releasing coupling, the combination with a clevis plate, of members, means which connects said members with said clevis plate for pivotal movement and which subjects said members to a predetermined amount of pressure, means on the clevis plate limiting the pivotal movement of said members to normally set positions, a relatively fixed coupler member, and coacting means on said coupler member and the first mentioned members, said coacting means being disengageable to release said coupler member, by the pivotal movement of the first mentioned members, when all of said members are subjected to an excessive pulling force.

FRED W. REIMOLD.